(12) United States Patent
Szalony et al.

(10) Patent No.: US 7,025,167 B2
(45) Date of Patent: Apr. 11, 2006

(54) SHAFT TO TRANSFER TORQUE IN A VEHICLE

(75) Inventors: Norman Szalony, Brighton, MI (US); David Majors, Plymouth, MI (US); Walt Golembiewski, Jr., Ray, MI (US); Mitch Glowacki, West Bloomfield, MI (US); Kenneth Horen, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 384 days.

(21) Appl. No.: 10/077,215

(22) Filed: Feb. 15, 2002

(65) Prior Publication Data

US 2003/0155171 A1    Aug. 21, 2003

(51) Int. Cl.
*B60K 17/22* (2006.01)
(52) U.S. Cl. ............... 180/376; 180/906; 29/898.12
(58) Field of Classification Search ............. 180/376, 180/906; 29/898.12, 458; 148/516, 521
See application file for complete search history.

(56) References Cited

U.S. PATENT DOCUMENTS

| | | | |
|---|---|---|---|
| 1,541,007 A | | 6/1925 | Thiemer |
| 2,163,981 A | * | 6/1939 | Lawrence ................. 180/359 |
| 2,510,362 A | | 6/1950 | Anderson |
| 3,063,266 A | | 11/1962 | Rabson |
| 3,367,142 A | * | 2/1968 | Groves et al. ............. 464/162 |
| 3,642,522 A | * | 2/1972 | Gass et al. .............. 427/249.19 |
| 3,813,899 A | | 6/1974 | Abrahamer |
| 4,003,219 A | | 1/1977 | Stull |
| 4,552,544 A | * | 11/1985 | Beckman et al. ........... 464/162 |
| 4,819,755 A | | 4/1989 | Smemo et al. |
| 4,945,745 A | | 8/1990 | Bathory et al. |
| 5,042,153 A | * | 8/1991 | Imao et al. .............. 29/898.12 |
| 5,160,451 A | * | 11/1992 | Eidenschink ........... 252/299.01 |
| 5,186,079 A | * | 2/1993 | Gee ......................... 74/607 |
| 5,503,481 A | * | 4/1996 | Hashimoto et al. ........ 384/569 |
| 5,549,764 A | * | 8/1996 | Biltgen et al. ............. 148/222 |
| 5,655,968 A | | 8/1997 | Burton |
| 5,716,276 A | | 2/1998 | Mangas et al. |
| 5,720,102 A | * | 2/1998 | McClanahan ........... 29/898.12 |
| 5,772,520 A | | 6/1998 | Nicholas et al. |
| 5,903,965 A | * | 5/1999 | Fletcher et al. ............. 29/458 |
| 5,930,908 A | * | 8/1999 | Patrisso et al. ............. 33/600 |
| 5,961,388 A | * | 10/1999 | Breidenbach et al. ....... 464/133 |
| 6,189,434 B1 | * | 2/2001 | Kawaguchi et al. .......... 92/71 |
| 6,199,769 B1 | * | 3/2001 | Weddle .................... 239/172 |
| 6,279,221 B1 | | 8/2001 | Glowacki et al. |
| 6,732,606 B1 | * | 5/2004 | Zhu et al. ................... 74/460 |

FOREIGN PATENT DOCUMENTS

JP            401305196 A    * 12/1989

\* cited by examiner

*Primary Examiner*—Paul N. Dickson
*Assistant Examiner*—Toan C. To

(57) ABSTRACT

One preferred embodiment of the invention is a shaft to transfer torque in a vehicle including a first member having internal splines and a second member having external splines engagable with the internal splines to allow telescopic movement between the first member and the second member and to transfer torque between the first member and the second member. The external spline has a coating to reduce friction during the telescopic movement. Another preferred embodiment of the invention is a suspension system for a vehicle including a biasing device and the above-described shaft.

12 Claims, 2 Drawing Sheets

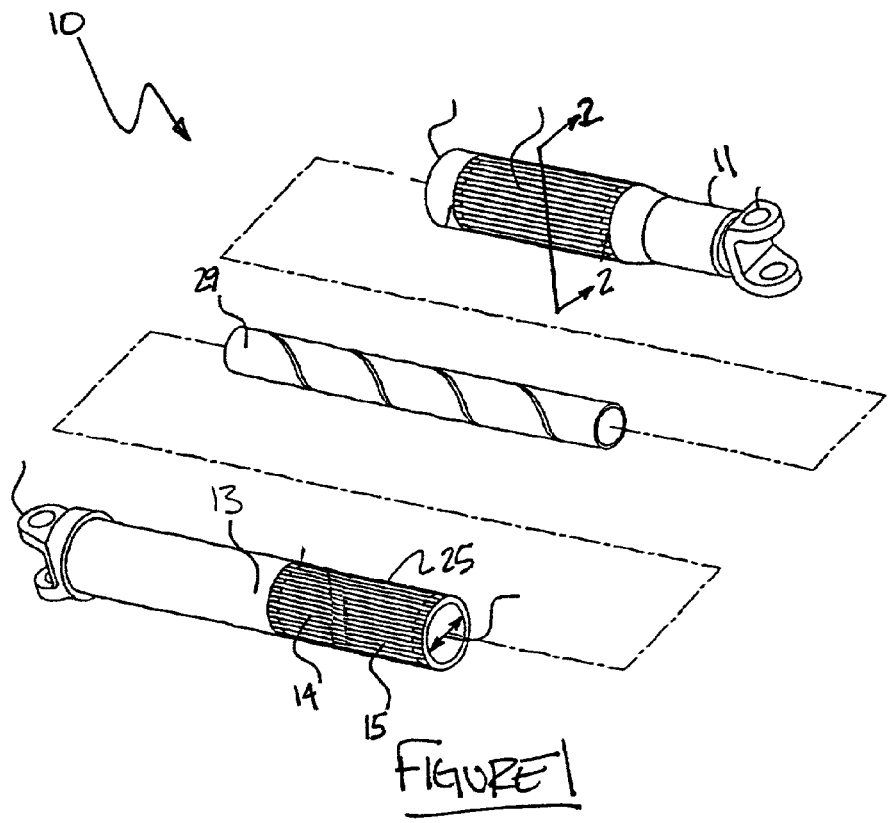
FIGURE 1
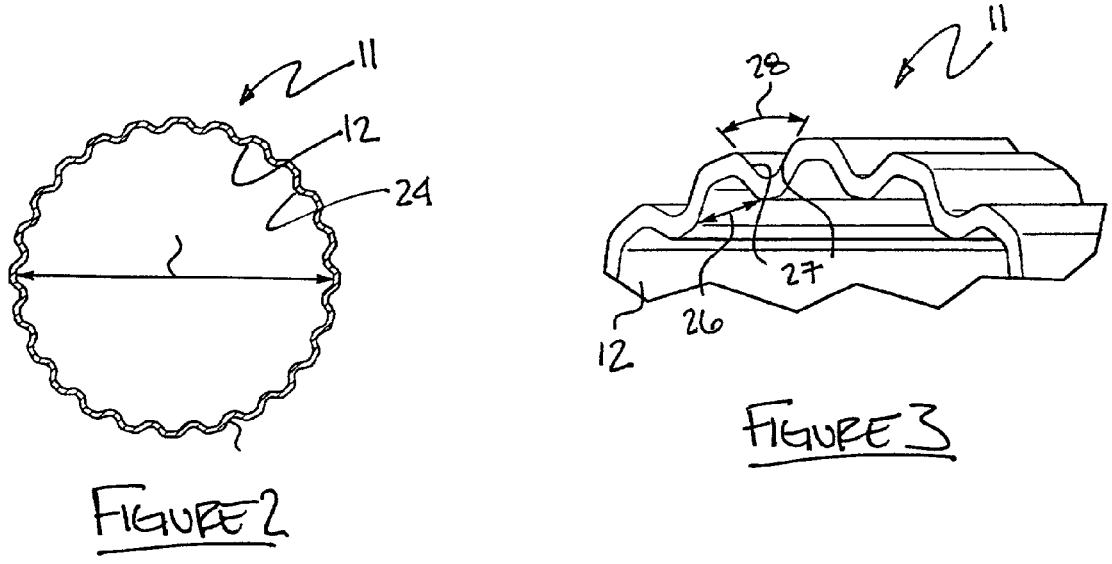
FIGURE 2
FIGURE 3

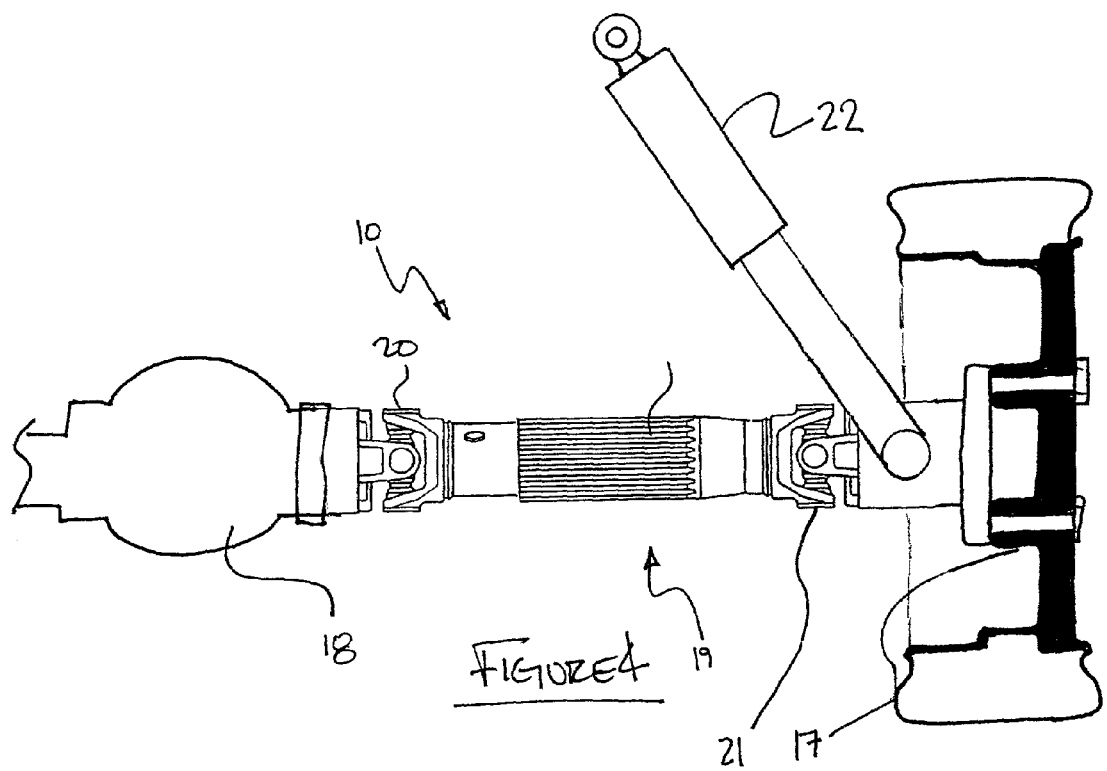

SHAFT TO TRANSFER TORQUE IN A VEHICLE

TECHNICAL FIELD

This invention relates generally to the automotive field, and more specifically to an improved shaft to transfer torque between an engine and a wheel of a vehicle.

BACKGROUND

In a typical front-wheel-drive based vehicle with all-wheel-drive capabilities, the rear wheels are coupled to a rear differential through a complex arrangement of two plunging constant velocity joints and a half shaft. The half shaft allows for the transfer of torque, while the two plunging constant velocity joints allow for both the vertical movement of the wheel and the relative change in distance between the wheel and the differential. The problem with this arrangement is the cost and weight of the plunging constant velocity joints, which total approximately 75% of the half shaft assembly. Thus, there is a need in the automotive field to create an improved shaft to transfer torque between the engine and the wheels of a vehicle with reduced cost and weight.

BRIEF DESCRIPTION OF THE FIGURES

FIG. 1 is an unassembled perspective view of a shaft made in accordance with the teachings of the preferred embodiment of the invention;

FIG. 2 is a side view of the shaft taken along view line 2—2;

FIG. 3 is a fragmented perspective view of the portion of the shaft shown in FIG. 2, which illustrates the internal splines formed upon the shaft of the preferred embodiment of the invention; and FIG. 4 is a side view of the shaft with a biasing device according to the teachings of the preferred embodiment of the invention.

DESCRIPTION OF THE PREFERRED EMBODIMENTS

The following description of the preferred embodiments of the invention is not intended to limit the invention to these preferred embodiments, but rather to enable any person skilled in the automotive field to make and use this invention.

As shown in FIGS. 1 and 2, the shaft 10 of the preferred embodiment includes a first member 11 having internal splines 12 (shown in FIG. 2) and a second member 13 having external splines 14. The external splines 14 are engagable with the internal splines 12 to allow telescopic movement between the first member 11 and the second member 13 and to transfer torque between the first member 11 and the second member 13. The external splines 14 have a coating 15 to reduce friction during the telescopic movement.

As shown in FIG. 4, the shaft 10 of the preferred embodiment is used in a vehicle to transfer torque between the engine (not shown) and a wheel 17 of the vehicle and, more specifically, to transfer torque between a power distribution device 18 and the "auxiliary wheels" of an all-wheel-drive vehicle. In a front-wheel-drive based all-wheel-drive vehicle, the "auxiliary wheels" are the rears wheels, while in a rear-wheel-drive based all-wheel-drive vehicle, the "auxiliary wheels" are the front wheels. In these vehicles, the power distribution device 18 is preferably a conventional differential device. In this environment, the shaft 10 acts as a half shaft 19 and is preferably coupled with the power distribution device 18 with a first cardan universal joint 20 and is preferably coupled with the wheel 17 with a second cardan universal joint 21. The shaft 10, of course, could be alternatively coupled with other suitable devices and could be used in other suitable environments, such as between the engine and the differential (acting as a "driveshaft" or "propshaft"), to transfer torque across a particular distance.

The preferred embodiment also includes a biasing device 22 connected to the shaft 10. The biasing device 22, which functions to support the vehicle on the wheel 17 and to absorb road imperfections, may include a conventional coil spring and damper combination, a leaf-spring and damper combination, an active suspension unit, or any other suitable biasing device. The half shaft 19 is preferably attached to the biasing device 22 with a conventional joint 23, but may alternatively be attached with any suitable device.

As shown in FIGS. 1 and 2, the first member 11 and the second member 13 of the preferred embodiment are round, tubular, and generally hollow. The internal splines 12 are preferably circumferentially formed upon an internal surface 24 of the first member 11, while the external splines 14 are preferably circumferentially formed upon an external surface 25 of the second member 13. In the preferred embodiment, the first member 11 and the second member 13 are substantially steel. In alternative embodiments, the first member 11 and the second member 13 are preferably any sufficiently strong material, such as aluminum, magnesium, or a composite material, to transfer torque between the engine and the wheel of the vehicle without substantial deformation.

As shown in FIGS. 2 and 3, the internal splines 12 of the preferred embodiment allow for relatively wide mating surfaces (or "working areas"). In the preferred embodiment, the internal splines 12 have a pitch diameter 26 equal to about 25 to about 100 millimeters. These splines allow for better distribution of the axial loads imparted upon the first member and the second member to reduce the overall wear of the internal splines 12 and the working or operating life of the shaft. In the preferred embodiment, each end wall 27 of each spline cooperatively forms an angle 28 of about sixty degrees (60°), although other angular configurations may be used. Further, while a portion of only the internal splines 12 of the first member 11 are shown in FIG. 3, it should be realized that the external splines are substantially similar.

The second member 13 is adapted to telescopically penetrate the first member 11 during the suspension movement of the wheel and to allow the internal splines 12 and the external splines 14 to cooperatively intermesh. As shown in FIG. 1, the coating 15 on the external splines 14 functions to reduce friction during the telescopic movement of the first member 11 and the second member 13. In the preferred embodiment, the coating 15 is tungsten disulfide, sold under the tradename MicroBlue® by Material Technologies, Inc. The MicroBlue® coating 15 is preferably applied with a thickness less than about 10 microns. In an alternative embodiment, the coating 15 is preferably a nylon material, sold under the tradename Nylon 66 by E.I. du Pont de Nemours and Company. Further, in the preferred embodiment, the external splines 14 also have an isotropic surface finish, as described in U.S. Pat. No. 5,503,481 entitled "Bearing Surfaces with Isotropic Finish", issued on 2 Apr. 1996, and incorporated in its entirety by this reference. The tungsten disulfide coating over an isotropic surface finish significantly reduces the friction between the first member and the second member, while increasing the wear and durability of the shaft. In alternative embodiments, any suitable coating 15 that reduces the friction to a sufficient level may be used on the external splines 14 of the second member 13.

The shaft 10 of the preferred embodiment also includes a substantially round and generally tubular shaped vibration-dampening member 29. The vibration-dampening member 29 functions to absorbs at least some of the vibrational energy generated by the first member 11 and the second member 13 during the transfer of torque between the engine and the wheel and during the suspension movement of the wheel. The vibration-dampening member 29 is preferably adapted to conform to the shape of the first member 11 and the second member 13 and is preferably removably and selectively placed within the assembled first member 11 and the second member 13. The vibration-dampening member 29 is preferably formed conventional and commercially available cardboard, but may alternatively be formed from a variety of other vibration dampening materials.

As any person skilled in the automotive filed will recognize from the previous detailed description and from the figures and claims, modifications and changes can be made to the preferred embodiments of the invention without departing from the scope of this invention defined in the following claims.

We claim:

1. A shaft to transfer torque in a vehicle, comprising:
   a first member having internal splines; and
   a second member having external splines engagable with said internal splines to allow telescopic movement between said first member and said second member and to transfer torque between said first member and said second member,
   wherein said external splines further include an isotropic surface finish, and
   wherein said external splines have a nylon coating applied to the isotropic surface finish to reduce friction during the telescopic movement.

2. A shaft to transfer torque in a vehicle, comprising:
   a first member having internal splines; and
   a second member having external splines engagable with said internal splines to allow telescopic movement between said first member and said second member and to transfer torque between said first member and said second member,
   wherein said external splines further include an isotropic surface finish, and
   wherein said external splines have a tungsten disulfide coating applied to the isotropic surface finish to reduce friction during the telescopic movement.

3. The shaft of claim 2, wherein said coating measures less than approximately 10 microns thick.

4. A suspension system for a vehicle having a wheel and a power distribution device, the suspension system comprising:
   a biasing device to suport the vehicle on the wheel and to absorb road imperfections; and
   a shaft to transfer torque from the power distribution device to said wheel, the shaft including a first member having internal splines and a second member having external splines engagable with said internal splines to allow telescopic movement between said first member and said second member and to transfer torque between said first member and said second member,
   wherein said external splines further include an isotropic surface finish, and
   wherein said external splines have a nylon coating applied to the isotropic surface finish to reduce friction during the telescopic movement.

5. The suspension system of claim 4, wherein one of said first and second members is adapted to couple with the power distribution device and one of said first and second members is adapted to couple with the wheel.

6. The suspension system of claim 4, further comprising a first universal joint coupling said shaft and the power distribution device.

7. The suspension system of claim 6, further comprising a second universal joint coupling said shaft and the wheel.

8. A suspension system for a vehicle having a wheel and a power distribution device, the suspension system comprising:
   a biasing device to support the vehicle on the wheel and to absorb road imperfections; and
   a shaft to transfer torque from the power distribution device to the shaft including a first member having internal splines and a second member having external splines engagable with said internal splines to allow telescopic movement between said first member and said second member and to transfer torque between said first member and said second member;
   wherein said external splines further include an isotropic surface finish, and
   wherein said external splines have a tungsten disulfide coating applied to the isotropic surface finish to reduce friction during the telescopic movement.

9. The suspension system of claim 8, wherein said coating measures less than approximately 10 microns thick.

10. The suspension system of claim 8, wherein one of said first and second members is adapted to couple with the power distribution device and one of said first and second members is adapted to couple with the wheel.

11. The suspension system of claim 8, further comprising a first universal joint coupling said shaft and the power distribution device.

12. The suspension system of claim 11, further comprising a second universal joint coupling said shaft and the wheel.

* * * * *